March 12, 1940.   J. W. LAMBERT   2,193,070
LAWN BROOM
Filed Oct. 15, 1937
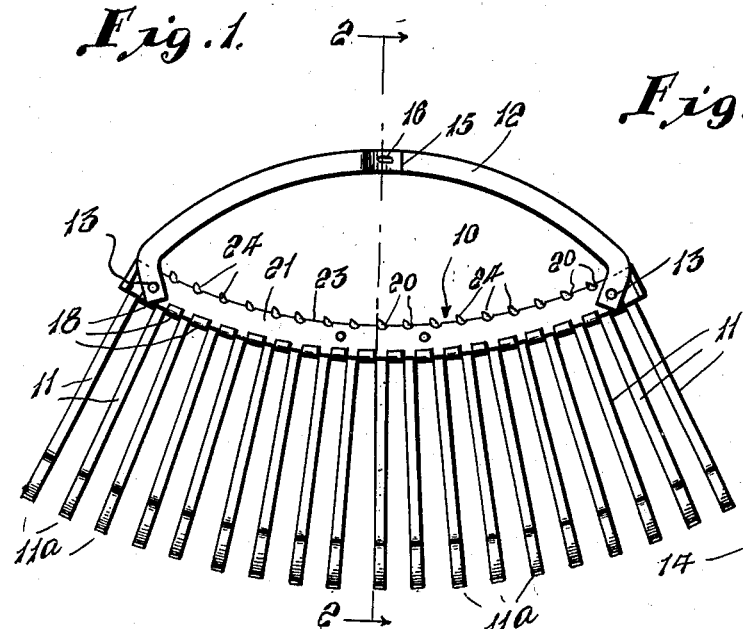
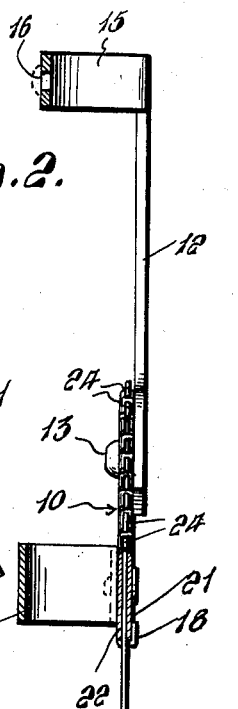
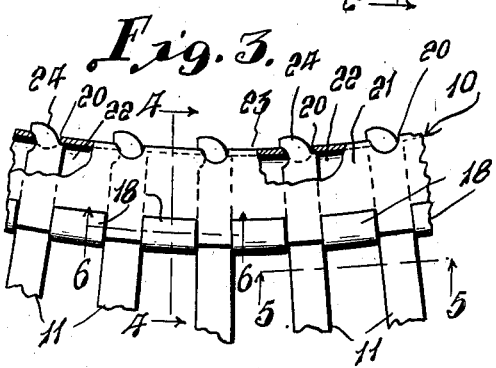
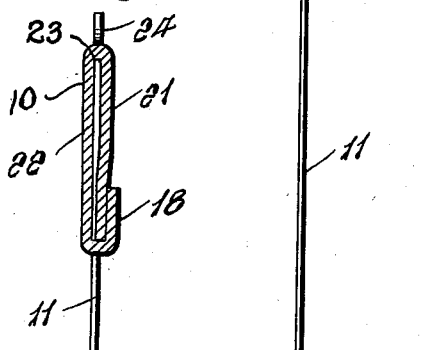
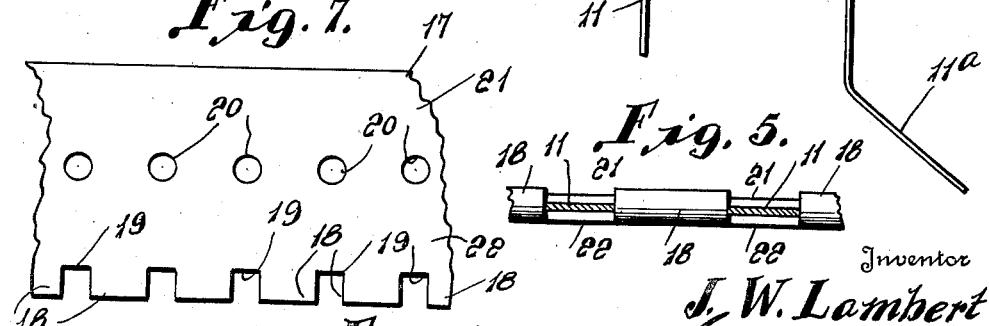
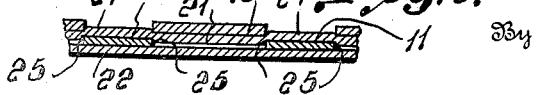
Inventor
J. W. Lambert
By
Attorney Patented Mar. 12, 1940

2,193,070

UNITED STATES PATENT OFFICE 2,193,070

LAWN BROOM

John W. Lambert, Anderson, Ind., assignor to The American Fork and Hoe Company, Cleveland, Ohio, a corporation of Ohio Application October 15, 1937, Serial No. 169,285

7 Claims. (Cl. 56—400.17)

This invention relates to certain new and useful improvements in lawn brooms.

The primary object of the invention resides in the provision of a lawn broom of metallic construction, preferably produced by a punching operation on cold rolled stock.

A further object of the invention is to provide a lawn broom or rake of the foregoing character with the individual and spaced fingers or tines thereof separately attached to the frame or head of the broom, preferably by a pressing operation with the connection between the tines and head being of a character to permit individual removal of a tine for replacement thereof, should such occasion arise.

With the above and other objects in view that will become apparent as the nature of the invention is better understood, the same consists in the novel form, combination, and arrangement of parts hereinafter more fully described, shown in the accompanying drawing and claimed.

In the drawing:

Figure 1 is a bottom plan view of a lawn broom constructed in accordance with the present invention, the handle being omitted, Figure 2 is a vertical cross-sectional view taken on line 2—2 of Figure 1 showing the spaced sockets or recesses carried by two parts of the broom head for the attachment of a handle, Figure 3 is a fragmentary bottom plan view of the arcuate head of the broom, partly in section, and illustrating the manner of individually connecting the spring fingers or tines of the broom to the arcuate head, Figure 4 is a cross sectional view taken on line 4—4 of Figure 3, Figure 5 is a detail sectional view taken on line 5—5 of Figure 3 showing the spacer tine retaining fingers carried by the arcuate head, Figure 6 is a detail sectional view taken on line 6—6 of Figure 3, and Figure 7 is a fragmentary developed plan view of the broom head to which the tines are attached.

The lawn broom being preferably formed by punching, bending and pressing operations on sheet metal comprises an arcuate head 10 from which individual resilient tines 11 project in spaced relation with the operative ends of the tines angularly bent as at 11ª common to lawn brooms or rakes of the type disclosed herein. The head of the lawn broom further includes an arcuate strap 12 attached at its ends as at 13 to opposite ends of the arcuate head 10, the strap 12 being in the plane of the arcuate head 10 and curved in the direction opposite to the curvature of said head.

As shown more clearly in Figures 1 and 2, a strap loop 14 is carried by the arcuate head 10 and projects laterally thereof and is in alinement with a laterally offset loop 15 carried by the arcuate strap 12 intermediate the ends thereof, the loops 14 and 15 receiving one end of an elongated handle, not shown, that is retained in said loops by means of a screw or pin adapted to be passed through an opening 16 in the strap 15 for engagement with said handle.

The arcuate head 10 is preferably struck from sheet metal and as shown in the developed plan view in Figure 7, the blank 17 carries at one longitudinal edge thereof relatively wide spaced bendable fingers 18 defining intervening recesses 19. The blank 17 has spaced openings 20 punched therein at the longitudinal center line thereof, said openings respectively transversely alining with the recesses 19. To form the arcuate head 10, the blank 17 is folded on its longitudinal center line to provide side wall sections 21 and 22 with the openings 20 located at the fold line 23 of the blank, the folded blank by suitable operations being then moved into arcuate formation as shown in Figures 1 to 3.

Each tine 11 is of substantially the same width as a recess between the bendable fingers 18 and the end of each tine that is connected to the arcuate head 10 carries a hook 24 that has the bill thereof substantially in line with the adjacent side edge of the tine. The openings 20 in the fold line of the arcuate head are of slightly less diameter than the tines so that when a tine is engaged with the web or fold line 23 of the arcuate head 10, the bill of the hook 24 slightly projects laterally of the associated opening 20 to overlie the fold line 23 of the arcuate head.

After the tines 11 have their attaching ends passed between the side wall sections 21 and 22 of the arcuate head with the hooks 24 passed through the openings 20, said tines overlie the recesses 19 and are positioned between the bendable fingers 18, the latter that are carried by the side wall sections 22 being then bent to overlie the side wall section 21 to constitute spacers for the tines 11 and for retaining the hooks 24 in the openings 20 as will at once be appreciated from an inspection of Figure 3, the tines being held immovable relative to the arcuate head 10. By a pressing operation the fingers 18 are moved into intimate contact with the side wall 21 of the arcuate head which causes the latter to be depressed slightly out of the plane of the remaining portion of said wall where engaged by said fingers to provide side shoulders 25 as shown in Figure 6 that engage opposite side edges of the tines 11 for rigidly anchoring the latter in position.

From the above detailed description, it is believed that the construction of the lawn broom will at once be apparent and while there is herein shown and described the preferred embodiment, it is to be understood that minor changes may be made therein, such as will fall within the scope of the invention as claimed.

I claim:

1. In a lawn broom of the character described, an arcuate head comprising generally parallel side walls formed by reversely folding a portion of the head, tines having their ends positioned between the side walls, a hook on each tine engaged with the arcuate head at the folding zone and means carried by the head at points spaced from said folding zone for retaining the hooks engaged therewith and the tines in spaced relation, including spaced fingers carried by one wall of the head and overlying the other wall of the head, said fingers being respectively positioned between adjacent tines.

2. In a lawn broom of the character described, an arcuate head comprising substantially parallel side walls joined by a web portion, tines having their ends positioned between the side walls, a hook on each tine engaged with the arcuate head at the web portion, means carried by the head for retaining the hooks engaged therewith and the tines in spaced relation, including spaced fingers carried by one wall of the head and overlying the other wall of the head, said fingers being respectively positioned between adjacent tines and pairs of abutment shoulders on one wall of the arcuate head engaged with opposite side edges of the portions of the tines between the walls of the head for holding the retained ends of the tines against movements relative to the arcuate head.

3. In a lawn broom of the character described, an arcuate head formed from an elongated sheet metal blank folded on its longitudinal center line to provide side walls, the fold line having spaced openings therein, spaced fingers carried by the edge of one side wall forming recesses therebetween each substantially radially aligned with an opening, resilient tines, each having a hook at one end for passage through an opening and engageable with the fold line of the head laterally of the opening, and said fingers being respectively positioned between adjacent tines and overlying the adjacent edge of the other side wall.

4. In a lawn broom of the character described, an arcuate head formed from an elongated sheet metal blank folded on its longitudinal center line to provide side walls, the fold line having spaced openings therein, spaced fingers carried by the edge of one side wall forming recesses therebetween each substantially radially aligned with an opening, resilient tines, each having a hook at one end for passage through an opening and engageable with the fold line of the head laterally of the opening, and said fingers being respectively positioned between adjacent tines and overlying the adjacent edge of the other side wall, and pairs of shoulders on the wall underlying the fingers at each side edge of the fingers engaged with opposite sides of the portions of the tines between the walls for holding the tines immovable relative to the arcuate head.

5. In a lawn broom of the character described, an arcuate head formed from an elongated sheet metal blank folded on its longitudinal center line to provide side walls, the fold line having spaced openings therein, spaced fingers carried by the edge of one side wall forming recesses therebetween each in substantially radial alignment with an opening, resilient tines, each having a hook at one end for passage through an opening and engageable with the fold line of the head laterally of the opening and said fingers being respectively positioned between adjacent tines and overlying the adjacent edge of the other side wall, an arcuate strap carried by the arcuate head and said head and strap being constructed for attachment of a handle.

6. In a lawn broom of the character described, a cross head formed from an elongated sheet metal blank folded on its longitudinal center line to provide side walls, the fold line having spaced openings therein, spaced fingers carried by the edge of one side wall forming recesses therebetween, each substantially radially aligned with an opening, resilient tines, each having a hook at one end for passage through an opening and engageable with the fold line of the head laterally of the opening, and said fingers being respectively positioned between adjacent tines and overlying the adjacent edge of the other side wall.

7. In a lawn broom of the character described, a cross head comprising generally parallel side walls formed by reversely folding a portion of the head, tines having their ends positioned between the side walls, a hook on each tine engaged with the cross head at the folding zone and means carried by the cross head at points spaced from said folding zone for retaining the hooks engaged therewith and the tines in spaced relation, including spaced fingers carried by one wall of the cross head and overlying the other wall of the cross head, said fingers being respectively positioned between adjacent tines.

JOHN W. LAMBERT.